(12) United States Patent
Geng

(10) Patent No.: US 10,707,033 B2
(45) Date of Patent: Jul. 7, 2020

(54) BUTTON, GAME CONTROLLER AND REMOTE CONTROLLER

(71) Applicant: GoerTek Technology Co., Ltd., Qingdao, Shandong (CN)

(72) Inventor: Lin Geng, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/095,017

(22) PCT Filed: Dec. 31, 2016

(86) PCT No.: PCT/CN2016/114041
§ 371 (c)(1),
(2) Date: Oct. 19, 2018

(87) PCT Pub. No.: WO2018/010399
PCT Pub. Date: Jan. 18, 2018

(65) Prior Publication Data
US 2019/0157022 A1    May 23, 2019

(30) Foreign Application Priority Data
Jul. 14, 2016 (CN) .......................... 2016 1 0555406

(51) Int. Cl.
*H01H 13/14* (2006.01)
*A63F 13/24* (2014.01)
(Continued)

(52) U.S. Cl.
CPC ............. *H01H 13/14* (2013.01); *A63F 13/24* (2014.09); *A63F 13/98* (2014.09);
(Continued)

(58) Field of Classification Search
CPC .......... H01H 13/14; A63F 13/24; A63F 13/98
(Continued)

(56) References Cited

U.S. PATENT DOCUMENTS 5,821,482 A * 10/1998 Ootani ................. H01H 13/705
200/5 A
9,029,721 B2 * 5/2015 Ikeda .................... G06F 3/0338
200/341
(Continued)

FOREIGN PATENT DOCUMENTS

| CN | 2377671 Y | 5/2000 |
| CN | 2431634 Y | 5/2001 |

(Continued)

*Primary Examiner* — Nguyen Tran
*Assistant Examiner* — Iman Malakooti
(74) *Attorney, Agent, or Firm* — Fox Rothschild LLP; Carol E. Thorstad-Forsyth

(57) ABSTRACT

A button, a game controller and a remote controller are provided. The button comprises a cylindrical button cap (1) and a cylindrical button bracket (2). The button bracket (2) is provided with a first magnetic connector (3), and the button cap (1) is provided with a second magnetic connector (4) at a corresponding position. The button cap (1) is covered on the button bracket (2), and the button cap (1) and the button bracket (2) are connected by a magnetic attraction force between the first magnetic connector (3) and the second magnetic connector (4). The button cap (1) and the button bracket (2) may be further provided with engageable sawtooth structures (11, 21).

17 Claims, 2 Drawing Sheets

(51) Int. Cl.
*A63F 13/98* (2014.01)
*G05D 1/00* (2006.01)

(52) U.S. Cl.
CPC .... *A63F 2300/1043* (2013.01); *G05D 1/0016* (2013.01); *H01H 2231/008* (2013.01); *H01H 2231/032* (2013.01)

(58) Field of Classification Search
USPC ........................................................ 200/341
See application file for complete search history.

(56) References Cited

U.S. PATENT DOCUMENTS

2009/0107826 A1     4/2009   Wang et al.
2011/0098116 A1     4/2011   Liu

FOREIGN PATENT DOCUMENTS

| CN | 2842551 | Y | 11/2006 | |
|---|---|---|---|---|
| CN | 101202174 | A | 6/2008 | |
| CN | 101377982 | A | 3/2009 | |
| CN | 202450902 | U | 9/2012 | |
| CN | 103187195 | * | 7/2013 | ........... H01H 13/705 |
| CN | 103187195 | A | 7/2013 | |
| CN | 103794393 | * | 5/2014 | ............. H01H 13/02 |
| CN | 103794393 | A | 5/2014 | |
| CN | 105761985 | A | 7/2016 | |
| CN | 106057532 | A | 10/2016 | |
| CN | 206134560 | U | 4/2017 | |
| KR | 10-2011-0048880 | A | 5/2011 | |

\* cited by examiner

BUTTON, GAME CONTROLLER AND REMOTE CONTROLLER

CROSS REFERENCE TO RELATED APPLICATIONS

This application is a U.S. National Stage entry under 35 U.S.C. § 371 based on International Application No. PCT/CN2016/114041, filed on Dec. 31, 2016, which was published under PCT Article 21(2) and which claims priority to Chinese Patent Application No. 201610555406.5, filed on Jul. 14, 2016. The disclosure of the priority applications are hereby incorporated herein in their entirety by reference.

TECHNICAL FIELD

The present disclosure relates to the technical field of button manufacturing, and more particularly to a button, a game controller and a remote controller.

BACKGROUND

There are many buttons on the controllers such as game controller and the remote controller of unmanned aerial vehicles. The buttons in the prior art usually have an integrated structure, and the direction buttons are integrally mounted on the host. When a button needs to be replaced, the panel must be removed, but when it is being disassembled by ordinary users, the product structure is easy to damage, or it cannot be assembled back properly, and thus the host cannot work normally. On the other hand, the material rigidities, the sizes and the colors of the buttons are relatively monotonous, impossible or difficult to replace, so it cannot meet the diverse needs of users, such as different feelings, shapes, sizes and colors. The user experience is poor.

In the prior art, the structure of some buttons comprises a button cap and a button bracket. When the button is being dissembled or replaced, only the button cap needs to be removed; however, the button cap and the button bracket of this kind of buttons are generally fixed by rib positioning. A positioning rib and a positioning groove are provided on the button cap and the button bracket respectively. When the button cap is installed, the button cap is rotated until the positioning rib is stuck in the positioning recess, so the installation is inconvenient.

SUMMARY

In view of the above problems, the present disclosure provides a button, a game controller, and a remote controller, to solve the technical problem of the prior art that when the button is being dissembled, the product structure is easy to damage and the button replacement is inconvenient, and the conventional buttons cannot meet the diverse needs of users.

In order to achieve the above object, the technical solutions of the present disclosure are as follows:

The present disclosure provides a button, comprising: a cylindrical button cap and a cylindrical button bracket, wherein the button bracket is provided with a first magnetic connector, and the button cap is provided with a second magnetic connector at a corresponding position;

the button cap is covered on the button bracket, and the button cap and the button bracket are connected by a magnetic attraction force between the first magnetic connector and the second magnetic connector; and the button cap and the button bracket are further provided with a circumferential limiting assembly.

In some embodiments, the circumferential limiting assembly comprises: sawtooth structures that are provided along a periphery of an inner side wall of the button cap and along a periphery of an outer side wall of the button bracket and that are engageable.

In some embodiments, edges of the sawtooth structures are straight lines or arcs.

In some embodiments, a top portion of the button bracket is provided with a first mounting recess for mounting the first magnetic connector, and a corresponding position of the button cap is provided with a second mounting recess for mounting the second magnetic connector.

In some embodiments, the first magnetic connector is a ferromagnetic material, and the second magnetic connector is a magnetically attractable material;

or, the second magnetic connector is a ferromagnetic material, and the first magnetic connector is a magnetically attractable material;

or, both of the first magnetic connector and the second magnetic connector are a ferromagnetic material.

In some embodiments, elastic arms are symmetrically provided at a bottom of the button bracket and are parallel to a plane of the bottom of the button bracket; and a mounting hole is provided at a tip end of each of the elastic arms, and a screw is screwed into the mounting hole to fix the button bracket to a panel at a button mounting position.

In some embodiments, the number of the elastic arms is two or more.

In some embodiments, a boss corresponding to a button element at a button mounting position is provided at a bottom of the button bracket.

The present disclosure also provides a game controller comprising the button of any of the above.

The present disclosure also provides a remote controller comprising the button of any of the above.

The advantages effects of the present disclosure are as follows. The button according to the present disclosure comprises a cylindrical button cap and a cylindrical button bracket which are connected by a magnetic attraction force. When the button is being replaced or disassembled, only the magnetic attraction force needs to be overcome to remove the button cap, so the operation is simple and does not require any professional skill, and the internal structure of the product will not be damaged. Moreover, the button caps of different colors, different hardness and different hand feelings may be replaced, so it is suitable for users who have different needs and preferences for the buttons.

In addition, engageable sawtooth structures are provided along the periphery of an inner side wall of the button cap and along the periphery of an outer side wall of the button bracket. When the button is being installed, after the button cap is covered on the button bracket, the sawtooth structures on the button cap and the button bracket are automatically engaged by the attraction by the magnetic attraction force to realize the positioning and circumferential fixing of the button cap and the button bracket, so the installation is convenient.

BRIEF DESCRIPTION OF DRAWINGS

The present disclosure will hereinafter be described in conjunction with the following drawing figures, wherein like numerals denote like elements, and.

DETAILED DESCRIPTION

In order to make the objectives, technical solutions and advantages of the present disclosure clearer, the embodiments of the present disclosure will be further described in detail below with reference to the accompanying drawings.

Figure 1:
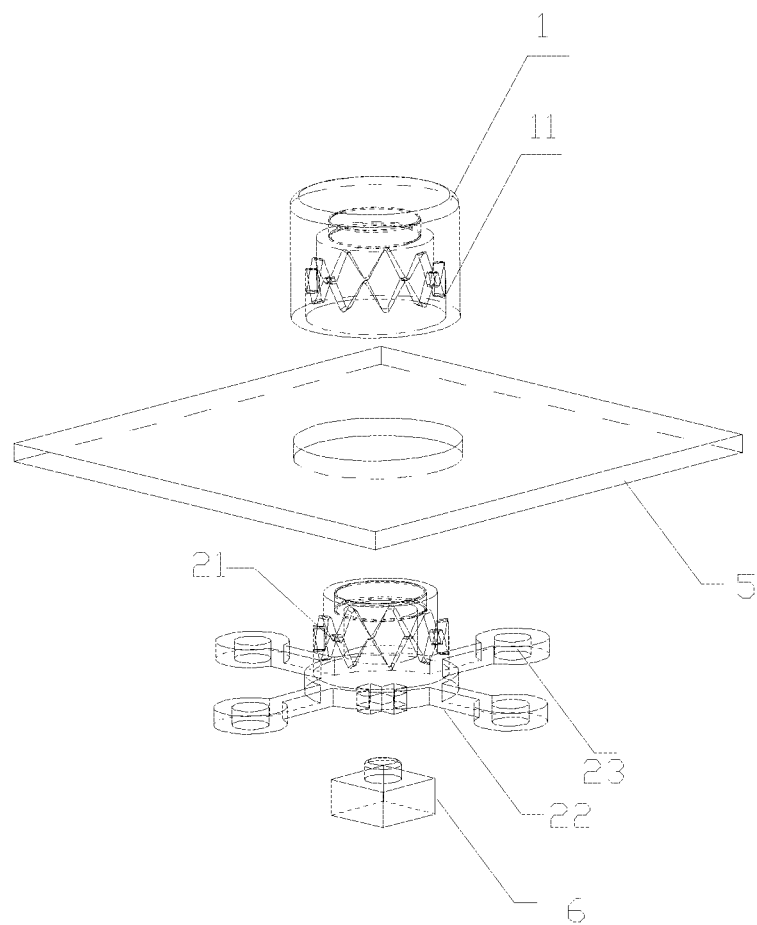
FIG. 1 is a schematic exploded view of a button according to an embodiment of the present disclosure.
Figure 2:
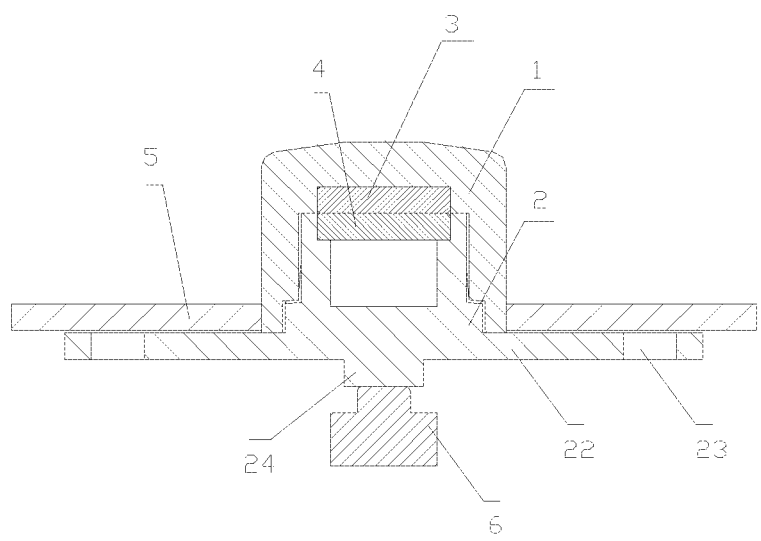
FIG. 2 is a cross-sectional view of a button according to an embodiment of the present disclosure.

As shown in FIG. 1 and FIG. 2, an embodiment of the present disclosure provides a button, comprising a cylindrical button cap 1 and a cylindrical button bracket 2. The button bracket 2 is provided with a first magnetic connector 3, and the button cap 1 is provided with a second magnetic connector 4 at a corresponding position. The button cap 1 is covered on the button bracket 2, and the button cap 1 and the button bracket 2 are connected by a magnetic attraction force between the first magnetic connector 3 and the second magnetic connector 4, thereby realizing the axial fixing between the button cap 1 and the button bracket 2.

The button cap 1 and the button bracket 2 are also provided with a circumferential limiting assembly to realize the circumferential fixing between the button cap 1 and the button bracket 2, so as to prevent the button cap 1 from rotating circumferentially when the button is pressed. In a particular embodiment of the present disclosure, the circumferential limiting assembly comprises sawtooth structures 11, 21 that are provided along the periphery of an inner side wall of the button cap 1 and along the periphery of an outer side wall of the button bracket 2 and that are engageable.

The first magnetic connector 3 is a ferromagnetic material, and the second magnetic connector 4 is a magnetically attractable material, such as iron, nickel and other materials that can be magnetically attracted.

Alternatively, the second magnetic connector 4 is a ferromagnetic material, and the first magnetic connector 3 is a magnetically attractable material.

Alternatively, both of the first magnetic connector 3 and the second magnetic connector 4 are ferromagnetic materials.

When the button cap 1 needs to be replaced, the only condition to be satisfied is that the external force applied is greater than the magnetic attraction force between the first magnetic connector 3 and the second magnetic connector 4, so the operation is simple and does not require any professional skill, and the internal structure of the product will not be damaged. Moreover, the button caps 1 of different colors, different hardness and different hand feelings may be replaced, so it is suitable for users who have different needs and preferences for the buttons.

When the button cap 1 is reinstalled, after the button cap 1 is covered on the button bracket 2, by the attraction by the magnetic attraction force, the sawtooth structures on the button cap 1 and the button bracket 2 are automatically engaged to realize the positioning and circumferential fixing between the button cap 1 and the button bracket 2, and the button cap 1 does not need to be rotated and fixed to a certain fixed orientation of the button bracket 2, as in the prior art, so the installation is convenient.

In an embodiment of the present disclosure, the top portion of the button bracket 2 is provided with a first mounting recess for mounting the first magnetic connector 3, and the corresponding position of the button cap 1 is provided with a second mounting recess for mounting the second magnetic connector 4.

Figure 3:
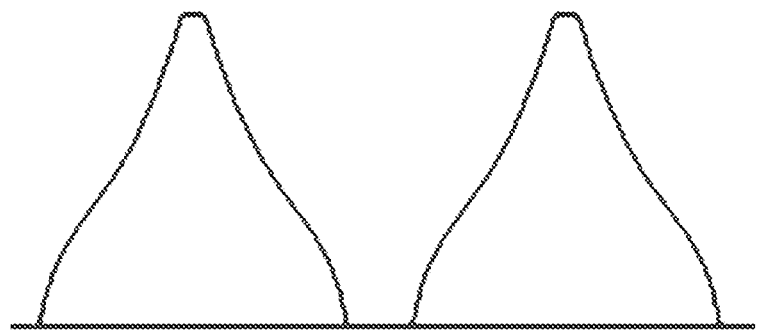
FIG. 3 is a partial schematic view showing another sawtooth structure according to an embodiment of the present disclosure.

In an embodiment of the present disclosure, the edges of the sawtooth structures are straight lines. In another embodiment of the present disclosure, as shown in FIG. 3, the edges of the sawtooth structures are arcs. Compared with the straight line shaped sawtooth structures, the engaging process of the arc shaped sawtooth structures is smoother when they are automatically engaged by the attraction by the magnetic attraction force.

In an embodiment of the present disclosure, the height of the sawtooth structures may be adjusted as needed. The heights of the sawtooth structures 11, 21 may be less than half of the height of the button cap 1, and may also be greater than half of the height of the button cap 1, as long as the engagement and fixing between the button cap 1 and the button bracket 2 can be achieved.

As shown in FIG. 1 and FIG. 2, elastic arms 22 are symmetrically provided at the bottom of the button bracket 2. For example, the number of the elastic arms 22 may be two or four, etc. The elastic arms 22 are parallel to a plane of the bottom of the button bracket 2. A mounting hole 23 is provided at the tip end of each of the elastic arms 22, and a screw is screwed into the mounting hole 23 to fix the button bracket 2 to a panel 5 at the button mounting position. The elastic arms 22 have elasticity, and after the external pressing force applied to the button is cancelled, the elastic arms 22 drive the button bracket 2 to rebound and reset.

As shown in FIG. 2, a boss 24 corresponding to a button element 6 at a button mounting position is provided at the bottom of the button bracket 2. When the button cap 1 is pressed, the boss 24 contacts and presses the button element 6 at the corresponding position, so that the electrical circuit corresponding to the button element 6 is closed.

Figure 4:
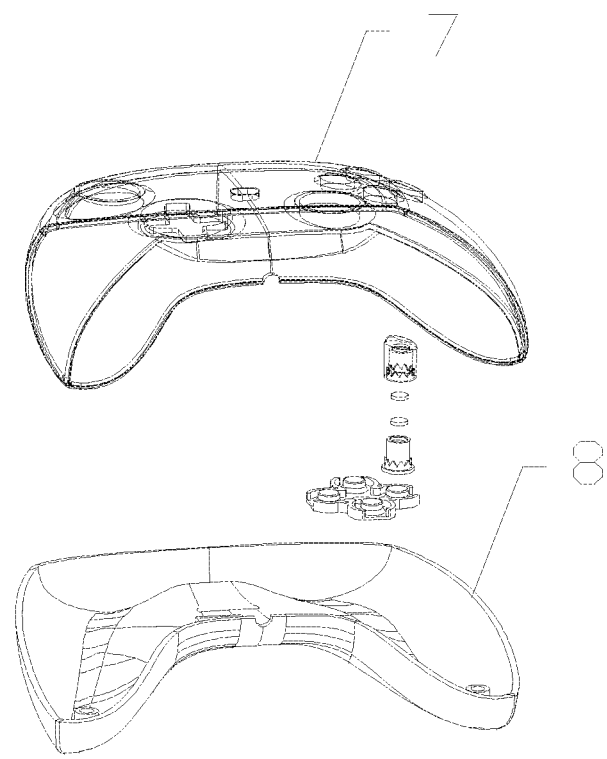
FIG. 4 is a schematic view of the structure of a game controller according to an embodiment of the present disclosure.

As shown in FIG. 4, an embodiment of the present disclosure further provides a game controller comprising an upper casing 7, a lower casing 8 and the above-mentioned buttons.

An embodiment of the present disclosure further provides a remote controller comprising the above-mentioned buttons.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A button, comprising: a cylindrical button cap and a cylindrical button bracket, wherein
   the button bracket is provided with a first magnetic connector, and the button cap is provided with a second magnetic connector at a corresponding position;
   the button cap is covered on the button bracket, and the button cap and the button bracket are connected by a magnetic attraction force between the first magnetic connector and the second magnetic connector, thereby realizing the axial fixing between the button cap and the button bracket; and the button cap and the button bracket are further provided with a circumferential limiting assembly to realize the circumferential fixing between the button cap and the button bracket, so as to prevent the button cap from rotating circumferentially when the button is pressed.

2. The button according to claim 1, wherein the circumferential limiting assembly comprises: sawtooth structures that are provided along a periphery of an inner side wall of the button cap and along a periphery of an outer side wall of the button bracket and that are engageable, and edges of the sawtooth structures are straight lines or arcs.

3. The button according to claim 1, wherein a top portion of the button bracket is provided with a first mounting recess for mounting the first magnetic connector, and a corresponding position of the button cap is provided with a second mounting recess for mounting the second magnetic connector.

4. The button according to claim 1, wherein the first magnetic connector is a ferromagnetic material, and the second magnetic connector is a magnetically attractable material;
or, the second magnetic connector is a ferromagnetic material, and the first magnetic connector is a magnetically attractable material;
or, both of the first magnetic connector and the second magnetic connector are a ferromagnetic material.

5. The button according to claim 1, wherein elastic arms are symmetrically provided at a bottom of the button bracket and are parallel to a plane of the bottom of the button bracket; and
a mounting hole is provided at a tip end of each of the elastic arms, and a screw is screwed into the mounting hole to fix the button bracket to a panel at a button mounting position.

6. The button according to claim 5, wherein:
the number of the elastic arms is two or more; and
the elastic arms have elasticity, and after the external pressing force applied to the button is cancelled, the elastic arms drive the button bracket to rebound and reset.

7. The button according to claim 1, wherein a boss corresponding to a button element at a button mounting position is provided at a bottom of the button bracket.

8. A game controller comprising a button, the button comprising: a cylindrical button cap and a cylindrical button bracket, wherein
the button bracket is provided with a first magnetic connector, and the button cap is provided with a second magnetic connector at a corresponding position;
the button cap is covered on the button bracket, and the button cap and the button bracket are connected by a magnetic attraction force between the first magnetic connector and the second magnetic connector, thereby realizing the axial fixing between the button cap and the button bracket; and
the button cap and the button bracket are further provided with a circumferential limiting assembly to realize the circumferential fixing between the button cap and the button bracket, so as to prevent the button cap from rotating circumferentially when the button is pressed.

9. A remote controller comprising a button, the button comprising: a cylindrical button cap and a cylindrical button bracket, wherein the button bracket is provided with a first magnetic connector, and the button cap is provided with a second magnetic connector at a corresponding position;

the button cap is covered on the button bracket, and the button cap and the button bracket are connected by a magnetic attraction force between the first magnetic connector and the second magnetic connector, thereby realizing the axial fixing between the button cap and the button bracket; and the button cap and the button bracket are further provided with a circumferential limiting assembly to realize the circumferential fixing between the button cap and the button bracket, so as to prevent the button cap from rotating circumferentially when the button is pressed.

10. The remote controller according to claim 9, wherein the circumferential limiting assembly comprises: sawtooth structures that are provided along a periphery of an inner side wall of the button cap and along a periphery of an outer side wall of the button bracket and that are engageable, and edges of the sawtooth structures are straight lines or arcs.

11. The remote controller according to claim 9, wherein a top portion of the button bracket is provided with a first mounting recess for mounting the first magnetic connector, and a corresponding position of the button cap is provided with a second mounting recess for mounting the second magnetic connector.

12. The remote controller according to claim 9, wherein:
two or more elastic arms are symmetrically provided at a bottom of the button bracket and are parallel to a plane of the bottom of the button bracket;
the elastic arms have elasticity, and after the external pressing force applied to the button is cancelled, the elastic arms drive the button bracket to rebound and reset; and
a mounting hole is provided at a tip end of each of the elastic arms, and a screw is screwed into the mounting hole to fix the button bracket to a panel at a button mounting position.

13. The remote controller according to claim 9, wherein a boss corresponding to a button element at a button mounting position is provided at a bottom of the button bracket.

14. The game controller according to claim 8, wherein the circumferential limiting assembly comprises: sawtooth structures that are provided along a periphery of an inner side wall of the button cap and along a periphery of an outer side wall of the button bracket and that are engageable, and edges of the sawtooth structures are straight lines or arcs.

15. The game controller according to claim 8, wherein a top portion of the button bracket is provided with a first mounting recess for mounting the first magnetic connector, and a corresponding position of the button cap is provided with a second mounting recess for mounting the second magnetic connector.

16. The game controller according to claim 8, wherein:
two or more elastic arms are symmetrically provided at a bottom of the button bracket and are parallel to a plane of the bottom of the button bracket;
the elastic arms have elasticity, and after the external pressing force applied to the button is cancelled, the elastic arms drive the button bracket to rebound and reset; and
a mounting hole is provided at a tip end of each of the elastic arms, and a screw is screwed into the mounting hole to fix the button bracket to a panel at a button mounting position.

17. The game controller according to claim 8, wherein a boss corresponding to a button element at a button mounting position is provided at a bottom of the button bracket.

* * * * *